Oct. 30, 1945.  M. B. BOYCE  2,388,114
LUBRICATION OF AUTOMOTIVE TIRES
Filed April 28, 1942  2 Sheets—Sheet 1
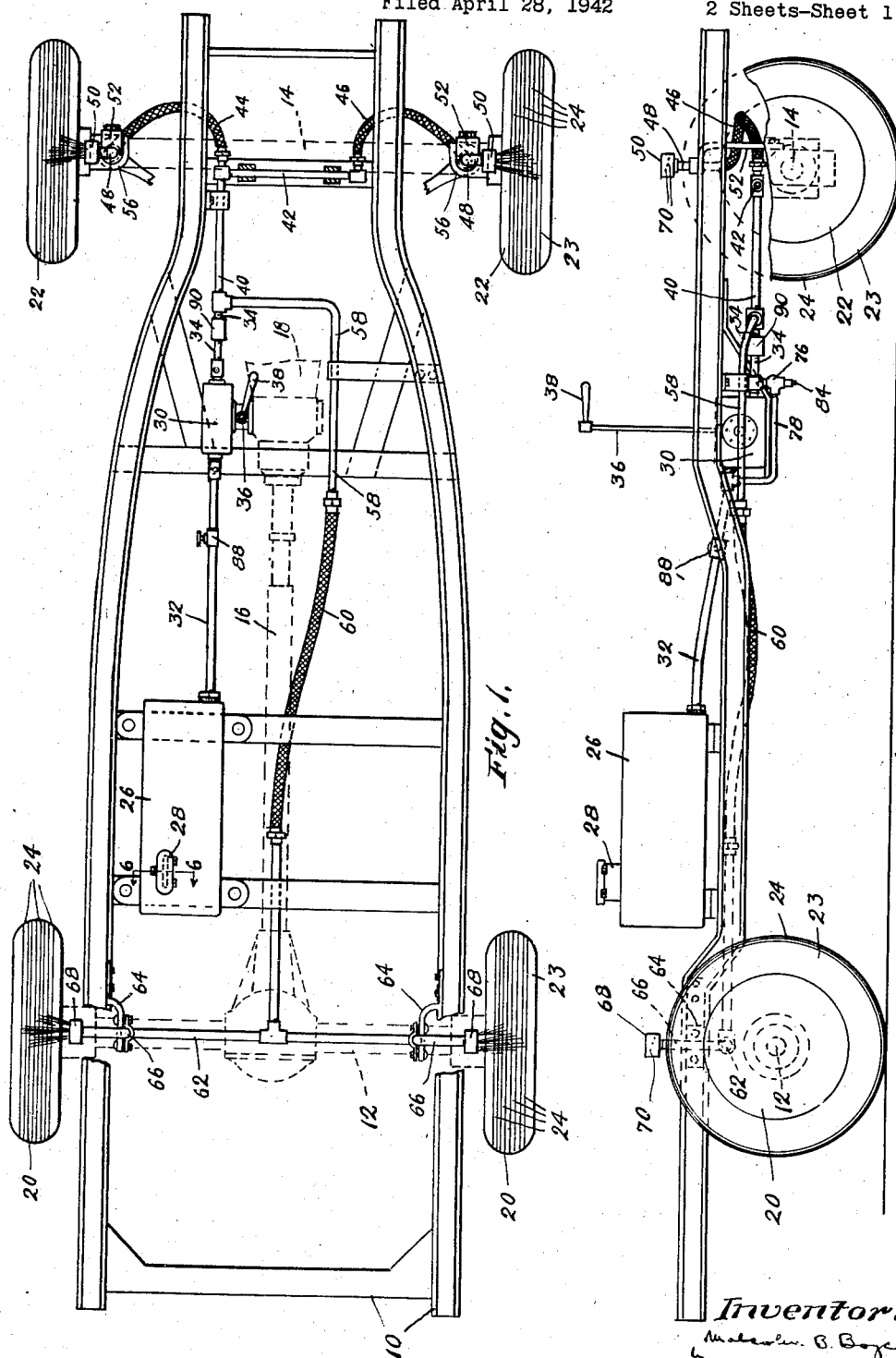

Oct. 30, 1945. M. B. BOYCE 2,388,114
LUBRICATION OF AUTOMOTIVE TIRES
Filed April 28, 1942 2 Sheets-Sheet 2
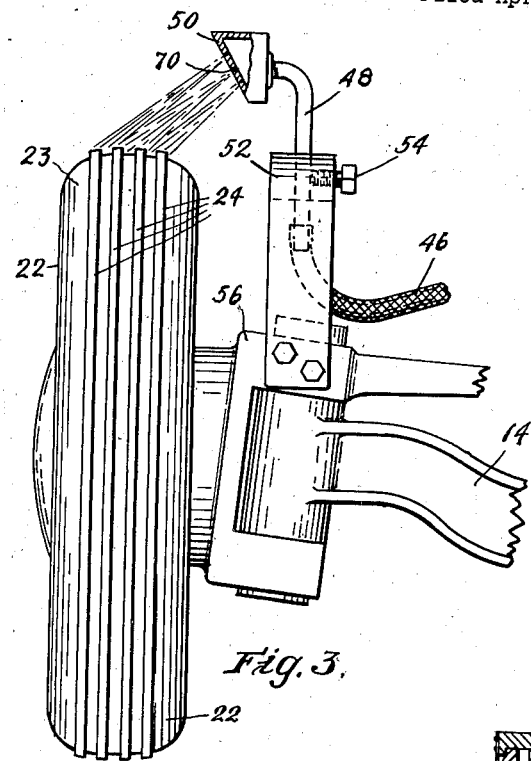
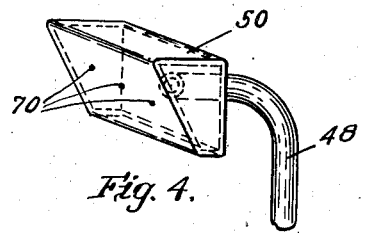
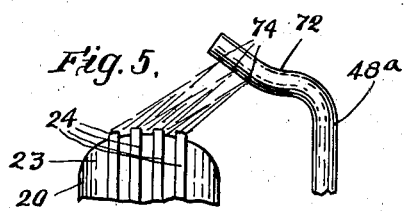
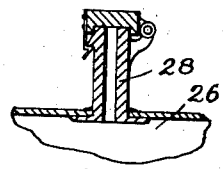
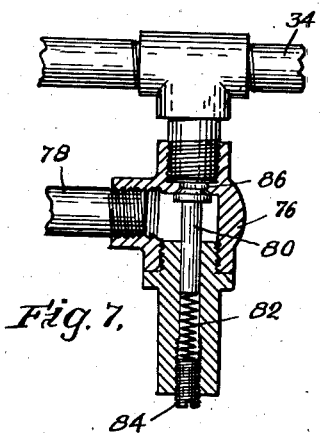
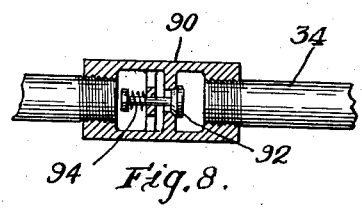
Inventor,
Malcolm B. Boyce Patented Oct. 30, 1945

2,388,114

UNITED STATES PATENT OFFICE 2,388,114

LUBRICATION OF AUTOMOTIVE TIRES

Malcolm B. Boyce, Haverhill, Mass.

Application April 28, 1942, Serial No. 440,877

1 Claim. (Cl. 180—1)

This invention relates to the preservation and reduction of wear of the tread portions of the pneumatic tire casings of automobiles.

One of the objects of the present invention consists in applying a suitable lubricant in suitable amounts to the tread portion of the tire to reduce the wear between the tire and the roadway over which the vehicle travels.

A further object of the invention consists in applying a film of water to the tread portion of the rotating tire in amounts sufficient to lubricate the tread and reduce the wear thereof and constantly renewing the deposit of water on the tread portion.

Another object of the invention is the provision of means for applying a jet of water upon the tire as the tire travels over the roadway and changing the water pressure in accordance with variations in speed of the automobile to maintain a uniform deposit of water on the tire at all vehicle speeds, at least between predetermined speeds.

A further object of the invention is the provision of apparatus for applying jets of water to the tread portion of an automobile tire while the automobile is moving, the apparatus including nozzles for directing jets onto the tires and the nozzles being offset from the radial line of the tire to prevent the nozzles from being clogged by dirt particles that may be thrown from the tire.

A further object is generally to provide improved apparatus for reducing the wear of automobile tires occasioned by reason of the contact between the tire and the roadway over which the tire rolls.

Fig. 1 is a plan view of an automobile chassis provided with mechanism for applying deposits of water to the tread surfaces of the automobile tires.

Fig. 2 is a side elevation of the apparatus of Fig. 1.

Fig. 3 is a front elevation in detail of one of the front or steering wheels and illustrating particularly the relation between the tread portion of the tire and the nozzle.

Fig. 4 is a perspective view of a nozzle.

Fig. 5 is a detail illustrating a modified form of nozzle.

Fig. 6 is a detailed sectional view of the filler entrance of the water storage tank, taken along line 6—6 of Fig. 1.

Fig. 7 is a sectional detail of the pressure relief valve associated with the pump of Figs. 1 and 2.

Fig. 8 is a sectional detail of a leakage-preventing valve.

The invention is herein illustrated as applied to the automobile having the frame 10 with the rear axle 12 and front axle 14, the rear axle being driven through any usual propeller shaft 16 and speed-changing transmission 18 from an engine not herein illustrated.

The rear axle is provided with wheels 20 and the front axle is provided with wheels 22. The wheels may have pneumatic tires provided with outer rubber-faced casings 23 of any usual or suitable construction and usually having anti-skid tread portions of ribbed or other construction as illustrated at 24, Fig. 3.

The present invention is concerned with means for reducing the wear of the tread surfaces of the tread portions 24 of the tires, and to this end consists in applying to the tread portions deposits of a lubricant in sufficient quantity to reduce the wear between the tread portions and the surface of the roadway with which the tread portions contact. A convenient lubricant is water and the present invention contemplates applying water to the tread surfaces of the tires while the automobile is in motion so as to maintain a deposit of water sufficient to reduce wear of the tread portion constantly upon the tread portions while the automobile is in motion, although mechanism is provided whereby the flow of lubricant to the tires can be stopped when desired.

The automobile chassis is provided with a lubricant or water storage tank 26 that can be attached to any suitable part thereof. The tank is provided with a filler neck 28 by which the supply of water can be renewed. Preferably, the filler neck is elongated in one dimension and is distinguishably different from the filler neck of the fuel tank so that an attendant can readily distinguish between the tire lubricant tank and the fuel tank of the automobile and cannot readily insert in the elongated neck the end of a fuel pipe.

A tire lubricant pump 30 is provided which is of any suitable construction, such as a gear pump, adapted to draw water from the tank 26 through a pipe 32 and discharge water under positive pressure into the pressure pipe 34. The pump preferably is a constant-volume, variable-pressure pump adapted to deliver a constant volume of liquid per revolution regardless of pressure and at a pressure that increases with the speed of the pump. The pump preferably is driven from the propeller mechanism of the vehicle and is herein shown as driven by a suitable connection with the transmission 18 of the automobile, there being a clutch interposed between the pump and the transmission controlled by the shaft 36 and handle 38 so that the pump can be started and stopped at the will of the driver.

The high pressure pipe 34 has a branch 40 that extends forwardly of the vehicle and has a second branch 42 extending transversely of the fore part of the vehicle and feeding into a pair of flexible hoses 44 and 46, each hose leading to a separate one of the front or steering wheels of the automobile. The free end of a flexible hose is fixed to and communicates with a pipe 48 terminating in a nozzle 50. Said pipe 48 is adjustable both vertically and angularly in a bracket 52 and is secured in adjusted position in the bracket by suitable means as a set screw 54. The bracket is fixed to and turns with any suitable part of the steering knuckle 56 that carries the front wheel. With this construction, the bracket and the nozzle turn with the wheel so that there is no shift in position between the wheel and nozzle regardless of the steering action of the front wheel. This described construction is the same for both front wheels.

The pressure pipe 34 also has a branch 58 extending rearwardly of the automobile and if necessary including a flexible section 60 therein which communicates with a cross pipe 62 carried by brackets 64 of the chassis and terminating in upstanding sections 66 having nozzles 68 similar to the nozzles 50 and similarly positioned with respect to the associated wheel.

All nozzles are provided with small orifices 70 of sufficient size and number to distribute a sufficient quantity of water onto the tread surface of the associated tire to lubricate the tread at the time it is in contact with the roadway to reduce the wear of the tire as it passes over the roadway. The nozzles are preferably located at one side of the radial line of the tires, as illustrated in Figs. 1 and 3, so that the orifices 70 are out of line with any dirt particles that may be thrown off the tire as it rotates. Hence, the orifices are not liable to become clogged in service. The nozzles 50 can be of any suitable type and in Fig. 5 is illustrated a different type of nozzle which consists merely in the suitably bent end 72 of a pipe 48a, the bent end 72 having suitable orifices 74 therein.

The flexible hoses 44 and 46 permit the steering movement of the front wheels without changing the relative position of the wheels and the nozzles.

The pump 30, being driven by the automobile mechanism at a speed proportional to the automobile speed, increases its delivery pressure substantially in proportion to the increase in car speed and hence the amount of lubricating water delivered to the tires is proportional to the speed and hence the amount of lubricant delivered per revolution is constant regardless of car speed. Above a certain car speed, however, it is preferred to maintain a constant nozzle pressure and for this purpose a pressure relief valve 76 is provided which receives pressure fluid from the pressure pipe 34 and relieves excess pressure through a pipe 78 into the inlet pipe 32. The pressure relief valve may be of any suitable form and construction and a suitable construction is illustrated in Fig. 7, wherein a movable valve member 80 is urged by the pressure of a spring 82, the pressure of which, and hence the water discharge pressure, is adjustable over a wide range by means of a screw 84, which valve member 80 controls the opening of the port 86 to relieve excessive pressure which flows into the relief pipe 78.

The application of water to the tires as they are moving also serves to abstract heat from the tires by the direct cooling effect of the water and by evaporation of the water and hence this action is beneficial although it is incidental to the present invention. The amount of water deposit on the tread portion of the tire depends, amongst other things, upon the nature or configuration of the tread, the character of the roadway over which the vehicle customarily travels, and the like. But a small amount of water deposit is considered necessary, although the amount should be sufficient for the purpose. Any excess is merely wasted.

Preferably, the sizes of the orifices in the nozzles are made such as to deliver the proper quantity of water to the treads, although with excessive orifice areas a throttle valve 88 can be placed in the inlet pipe 32 to adjust the amount of water deposited if desired.

The lubrication of the tires is not as effective when the car is travelling over a loose surfaced dirt road and at such times the pump can be unclutched from the propelling mechanism of the vehicle.

The invention is particularly intended to reduce the wear of the tread portions of present-day automotive tires which comprise an inflatable elastic inner tube surrounded by a flexible casing having a rubber impregnated or coated fabric base and a flexible elastic rubber or rubber-like tread, the casing and the tread bending or yielding at its region of contact with the roadway and the wear on the tread occurring at this region. The invention, however, is also applicable to solid rubber tires and other tires having a yielding engagement with the roadway.

In installations where the water level in the tank 26 is higher than the orifices and the pump is not entirely tight, so that water can pass slowly through the idle pump and leak out of the orifices, this leakage can be prevented by interposing a valve 90, Figs. 1 and 8, in the water line between the tank and the nozzles, as in the pressure pipe 34, the valve having a movable valve member 92 lightly loaded by a spring 94 to stop the flow of water from the tank when the pump is idle, but opening freely in response to the pump action.

I claim:

In a wheeled vehicle having pneumatic tires on its wheels, and propulsion means for moving the vehicle over a road surface, means for reducing friction between the tread portion of a tire and the road surface, comprising a nozzle arranged and adapted to apply a film of liquid only on the tread portion of the tire at a region thereof which is moving downward toward the road surface, whereby said film is carried on the tread into intervening lubricating relation between the tread and the road surface, means carried on the vehicle for storing liquid, and means for supplying liquid from said storing means to said nozzle, said last named means being operative in response to the speed of the vehicle to vary the amount of liquid supplied to said nozzle.

MALCOLM B. BOYCE.